Feb. 9, 1965 C. A. STONE ETAL 3,169,187
LOW ENERGY BETA RADIATION SYSTEM FOR FLUENT MATERIALS
WITH PLURAL SCINTILLATION FIBERS IN HEXAGONAL ARRAY
Filed Feb. 6, 1963 3 Sheets-Sheet 1
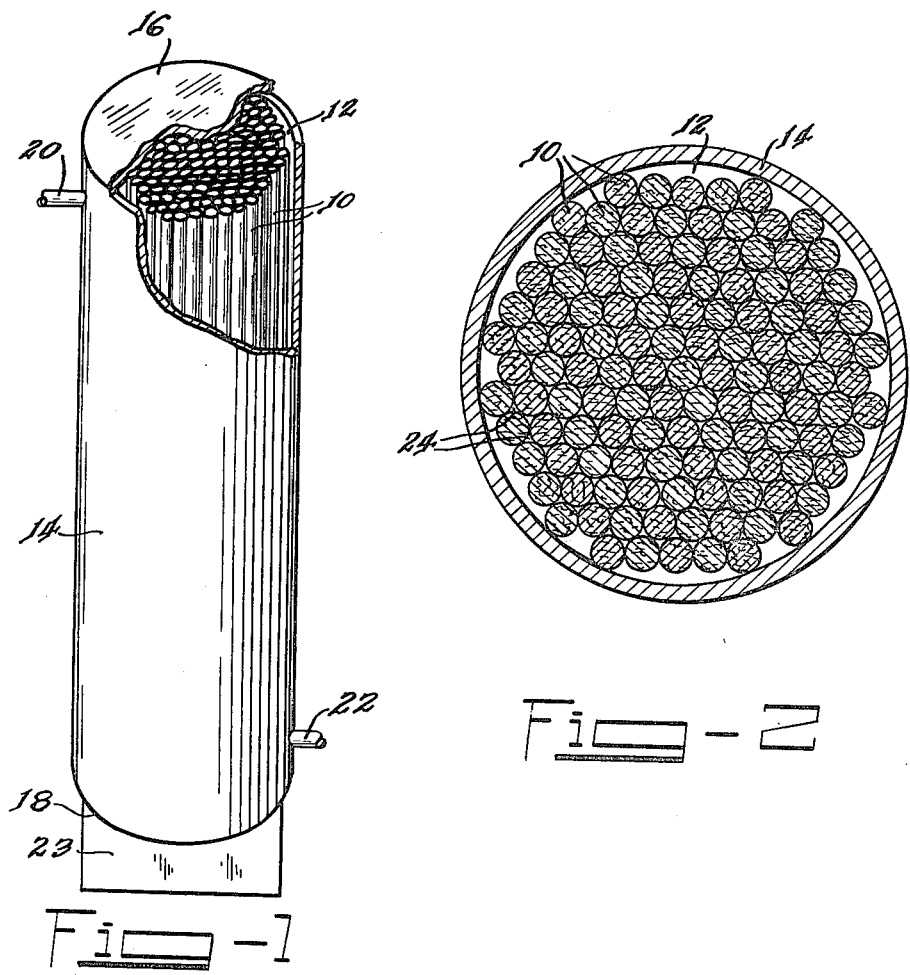
INVENTORS
Clinton A. Stone
Leonard Reiffel
Italo Filosofo
Attorney

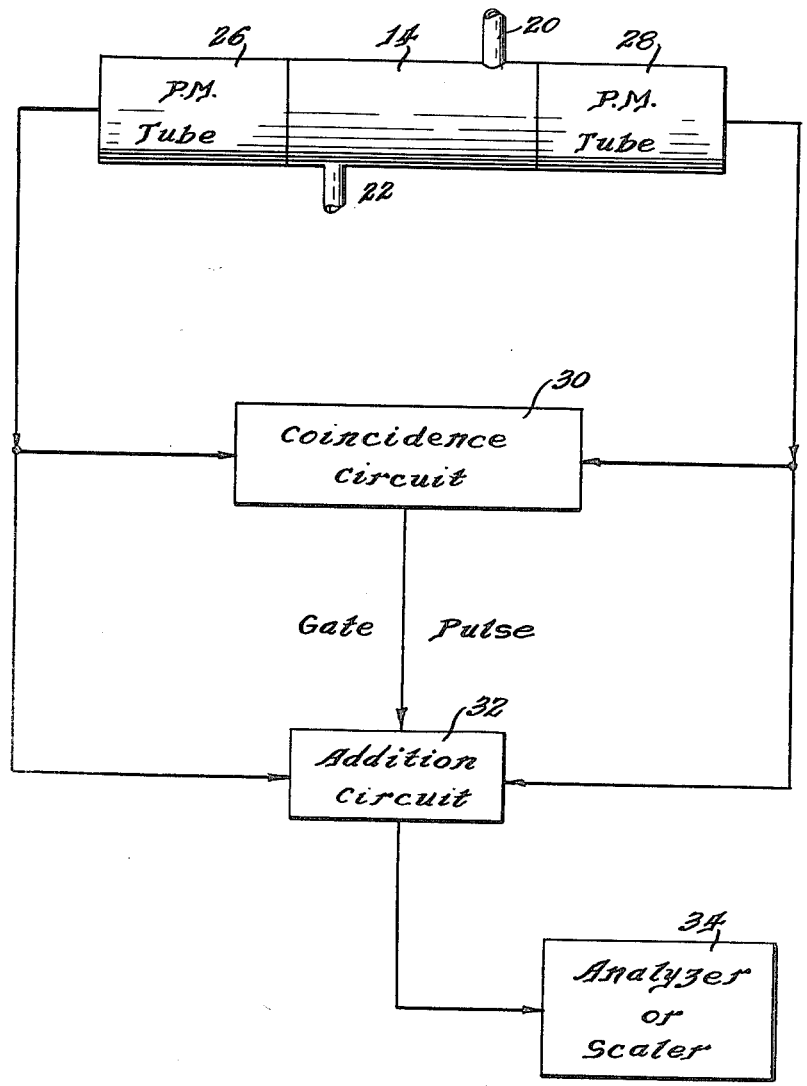

United States Patent Office 3,169,187
Patented Feb. 9, 1965

3,169,187
LOW ENERGY BETA RADIATION SYSTEM FOR FLUENT MATERIALS WITH PLURAL SCINTILLATION FIBERS IN HEXAGONAL ARRAY
Clinton A. Stone, South Holland, and Leonard Reiffel, Chicago, Ill., and Italo Filosofo, Padova, Italy, assignors to the United States of America as represented by the United States Atomic Energy Commission
Filed Feb. 6, 1963, Ser. No. 256,781
2 Claims. (Cl. 250—71.5)

This invention relates to radioactivity counters and more specifically to counters for detecting radioactivity in liquids or gases.

Radioactive isotopes carbon-14, sulfur-35 and tritium (hydrogen-3) have a wide usage in modern technology in routine diagnostic, analytic and inspection techniques. From this usage, a large number of samples are generated each day which have to be monitored for low energy beta rays characteristic of carbon-14, sulfur-35 and tritium.

The efficient detection of these low energy beta particles must encompass conversion of a large fraction of the available energy to a usable form followed by an effective transfer of this energy to the final electrical pulse which is counted. Further, it is desirable that large samples be accommodated so that small amounts of activity can be detected, the system be fast so that high counting rates can be measured, and the energy proportionality be retained so that discrimination against background or other species of radioactivity can be accomplished. Liquid scintillation and gas counters embody many of these characteristics and are widely used in the art. In a liquid scintillation counter, the sample is immersed, dissolved, or chemically combined with a high density (relative to the range of the betas) fluid which efficiently converts the energy to light. The light is transmitted without appreciable loss in some cases to a photomultiplier tube and is counted. This system requires varied and time consuming sample-scintillation preparation, has limited sample size capability, and loses the original form of the material. Frequently the sample is incompatible with the scintillating liquids because of chemical nature, solid content, or color. Similar limitations exist for gas counters.

It is therefore one object of the present invention to provide a device for detecting low energy beta radiation in a sample whereby the original form of the sample is retained.

It is another object of the present invention to provide a device for detecting low energy beta radiation in a sample with a high degree of efficiency.

It is another object of the present invention to provide a device for detecting low energy beta radiation in a sample without time consuming sample-scintillation preparation.

It is another object of the present invention to provide a device accepting large samples for detecting low energy beta radiation therein.

Other objects of the present invention will become more apparent as the detailed description proceeds.

In general the present invention comprises a cylindrical container having a plurality of scintillating fibers longitudinally disposed therein. The sample is injected into the container through entrance and exist ports provided therein and passes between the interstices of the fibers along the length thereof. Scintillations are caused in the fibers responsive to the radioactivity of the sample and the light therefrom is transmitted along the fibers to a photomultiplier located at the ends thereof.

More complete understanding of the present invention will best be obtained from consideration of the accompanying drawings in which:

FIG. 1 is a sketch of a preferred embodiment for the practice of the present invention.

FIG. 2 is a horizontal cross-section of the embodiment of FIGURE 1.

FIG. 5 is a schematic diagram showing coincident count detection with the present invention.

Figure 3:
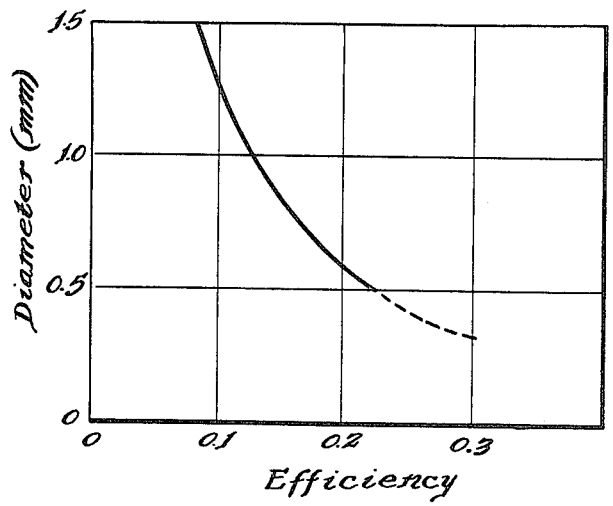
FIG. 3 is a graphical representation of fiber diameter versus efficiency in counting for the embodiment of FIGURE 1.

For the preferred embodiment shown in FIGURE 1, solid plastic or glass cylindrical scintillation fibers 10, of a suitable material such as Pilot scintillator B, are formed into a closely packed generally hexagonal array 12 and mounted in a container 14. A horizontal cross sectional view of the embodiment of FIGURE 1 is shown in FIGURE 2 to more clearly illustrate the fiber array 12. The fibers 10 are cut to a predetermined length and the length of container 14 is equal thereto. The array 12 of fibers 10 has the ends thereof polished for good optical coupling and hence maximum light transfer. A translucent plastic band (not shown) is used to band the fibers 10 whereby the hexagonal shape and polished end alignment thereof is maintained. End windows 16 and 18, made of a suitable glass such as Pittsburgh micro-slides, are used to seal the cylinder 14 after the fiber array 12 is in place. The polished ends of fiber array 12 are sealed to the interfaces of the end windows 16 and 18 with a thin coating of a suitable coupling compound such as Dow Corning QC-2-0057.

The container 14 has an inlet and outlet pipe 20 and 22 for insertion and removal of the sample under test. A photomultiplier tube 23 is coupled to one of the windows 16 or 18 to detect scintillations of the fibers 10 when the test sample is injected into the container 14 and the interstices 24 between the fibers 10, whereby detection of the radioactivity thereof is accomplished.

As shown in FIGURES 1 and 2 the container 14 is cylindrical and the fiber array 12 hexagonal. The present invention should not be limited to such a shape or configuration; the shape may just as readily be rectangular with cubic packing. Theoretically, in a cylindrical container having closely packed cylindrical solid fibers therein of uniform diameter, the intersticial volume thereof is a constant fraction of the total volume of the cylinder and independent of the diameter of the container. A similar relationship exists for a rectangular container packed with solid cylindrical fibers. In a rectangular configuration, the intersticial volume is 21.5% of the total volume and in the cylindrical container it is approximately 15% of the total volume. The cylindrical container 14 with the hexagonal fiber array 12 was chosen for convenience. Because of nonuniformity in fiber 10 dimensions, the interstitial volume for fibers 10 of 0.5, 1.0, and 1.5 millimeters in diameter in a container 14, 2 inches in length by 0.5 inch in diameter, varied from 11% to 21% of the total volume. However, it is apparent that using the arrangement described, an appreciable percentage of the volume of the counter is available for the containment and detection of the test sample.

The dimensions of the cusped interstices 24 between the fibers 10 are a function of the fiber diameter. The smaller the dimensions of the interstices 24, and therefore the fiber diameter, with respect to the average beta range, the larger the number of betas which will deposit adequate amounts of energy in the fibers 10. This increase in absorbed energy is countered by the reduction in light transmission with decreasing fiber diameter and by the practical considerations of easy sample injection and removal. Further, the transmission of light through fibers 10 is governed by the ratio of the length to the diameter thereof and the conditions of the surface of the fibers 10. The light propagation relies on total internal reflection and the surface must be near perfect while in contact with a medium of lower index of refraction. The number of reflections required to traverse the length of fibers 10 depends upon the diameter and the length of fibers 10.

Figure 4:
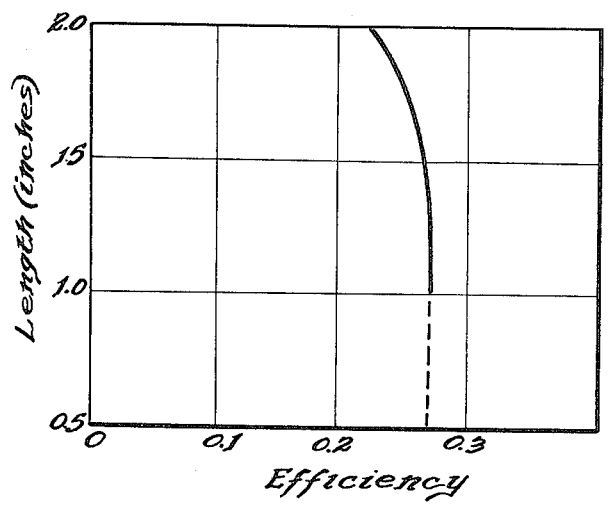
FIG. 4 is a graphical representation of fiber length versus efficiency in counting for the embodiment of FIGURE 1.

FIGURES 3 and 4 are graphical representations of fiber diameter and fiber length versus counting efficiency. The counting efficiency is defined as the integral counting rate of the sample minus the background of the system divided by the actual number of counts contained in the volume of the sample in the container 14. The sample used was liquid carbon-14, a calibrated standard source. A photomultiplier tube having high signal to noise ratio was used with a high voltage applied thereto of 1185 volts. The system was allowed to stabilize before measurements were taken.

For fiber diameter versus efficiency (FIGURE 3), fiber arrays 12 of 0.5 inch diameter and 2 inches long were used, the diameter of the fibers 10 being 0.5, 1.0, and 1.5 millimeters. The fibers exhibiting the greatest efficiency were the 0.5 millimeter fibers. The graph indicates a further increase in efficiency as the fiber diameter is decreased. However, availability in size and practicality of usage indicate that the 0.5 millimeter fiber is desirable for optimum operation.

For fiber length versus efficiency (FIGURE 4), fiber arrays 12 of 0.5 inch diameter having fibers of 0.5 millimeter diameter were used, the length of the fibers 10 being 1.0, 1.5 and 2.0 inches. As graphically shown, the optimum length for single tube scintillation counters would appear to be approximately 1.5 inches in length. Thus for optimum results, the fiber array 12 of FIGURE 1 should contain fibers 10 of 0.5 mm. in diameter and 1.5 inches in length.

The embodiment shown in FIGURE 1 and described above may be used for samples which are injected into the container 14 where they are counted and then removed, or for samples which are continuously injected and removed from the container 14, counting thereof being continuous.

Though the prior description has utilized only one photomultiplier tube coupled to one of the ends 16 or 18 of container 14, it is to be understood that two photomultiplier tubes may be used therewith as shown in FIGURE 5 to provide coincident counting with resulting reduction in background noise.

In FIGURE 5, a container 14 having a fiber array disposed therein as previously described has the ends thereof optically coupled to two photomultiplier tubes 26 and 28. The outputs from the tubes 26 and 28 are fed to a coincidence circuit 30 which delivers an output pulse only when coincident outputs from tubes 26 and 28 are received. The outputs from tubes 26 and 28 are fed to an addition circuit 32 where the two outputs are added responsive to the output pulse from the coincidence circuit 30. The output from the addition circuit 32 is fed to an analyzer or recorder 34. As previously recited, using the coincidence circuit reduces noise and background which coupled with the light gathering by the additional photomultiplier gives high efficiency and sensitivity to radioactive particle detection.

Though the embodiment of FIGURE 1 has been described supra as used in the detection of low energy beta particles for which it is particularly applicable, its use is not limited thereto. It is obvious that the embodiment may be used to detect other particles having different energy levels.

Persons skilled in the art will, of course, readily adapt the teachings of the invention to embodiments far different than the embodiment illustrated. Accordingly, the scope of the protection afforded the invention should not be limited to the particular embodiment thereof shown in the drawings and described above but shall be determined only in accordance with the appended claims.

What is claimed is:

1. A radiation counter for measuring the radioactivity of a liquid or gas sample comprising a cylindrical container having glass end walls, a plurality of like solid cylindrical scintillating fibers formed into a closely packed array essentially hexagonal in cross section and disposed longitudinally within said container, the ends of said fibers being optically coupled and sealed to the end walls of said container, means for injecting said sample into said container between the interstices of said fibers along the length thereof, and means for detecting scintillations at the end walls of said container, which scintillations are a measure of the radioactivity of said sample.

2. A radiation counter for measuring low energy beta particles in a liquid or gas sample comprising a cylindrical container, a plurality of solid cylindrical scintillating fibers formed into a closely packed array essentially hexagonal in cross section and disposed longitudinally within said container, each of said fibers being approximately 0.5 millimeter in diameter and 1.5 inches in length, means for injecting said sample into said container between the interstices of said fibers along the length thereof, and means for detecting scintillations at the ends of said fibers, which scintillations are a measure of the radioactivity of said sample.

References Cited by the Examiner
UNITED STATES PATENTS

| | | | |
|---|---|---|---|
| 2,961,541 | 11/60 | Ruderman | 250—71.5 |
| 3,005,100 | 10/61 | Thompson | 250—71.5 |
| 3,032,657 | 5/62 | Meier | 250—71.5 |
| 3,047,720 | 7/62 | Rickard | 250—71.5 |

RALPH G. NILSON, *Primary Examiner.*

JAMES W. LAWRENCE, *Examiner.*